United States Patent [19]

Jabarin et al.

[11] Patent Number: 4,601,926
[45] Date of Patent: Jul. 22, 1986

[54] PROCESS FOR APPLYING COPOLYESTER BARRIER LAYER ON POLYESTER CONTAINER

[75] Inventors: Saleh A. Jabarin, Holland; Gregory M. Fehn, Maumee, both of Ohio

[73] Assignee: Owens-Illinois, Inc., Toledo, Ohio

[21] Appl. No.: 694,375

[22] Filed: Jan. 24, 1985

[51] Int. Cl.$^4$ .................. B65D 23/08; B29C 45/14
[52] U.S. Cl. .................. 428/35; 428/480; 215/1 C; 264/509; 264/516
[58] Field of Search .............. 264/509, 516; 425/523; 428/35, 346, 480; 215/1 C

[56] References Cited

U.S. PATENT DOCUMENTS

| | | | |
|---|---|---|---|
| 2,959,812 | 11/1960 | Allen | 264/516 |
| 4,024,009 | 5/1977 | Amsden et al. | 215/1 C |
| 4,323,411 | 4/1982 | Uhlig | 264/509 |
| 4,398,017 | 8/1983 | Go | 528/173 |

FOREIGN PATENT DOCUMENTS 0142045 11/1981 Japan .................. 264/516

Primary Examiner—John E. Kittle
Assistant Examiner—James J. Seidleck
Attorney, Agent, or Firm—Philip M. Rice

[57] ABSTRACT

A polyester or copolyester container is made with a heat activated high barrier copolyester label applied to the container sidewall. The process for producing the high barrier container that is a hollow polyester or copolyester body with a barrier label effectively applied to its outer sidewall, includes forming the container by an extrusion blow method, injection blow method, orientation-blow method, or orientation blow-heat set method and applying the barrier label via an "in-mold" technique utilizing a heat-activatable high barrier copolyester resin as the adhesive.

13 Claims, 4 Drawing Figures

PROCESS FOR APPLYING COPOLYESTER BARRIER LAYER ON POLYESTER CONTAINER

The present invention is related to preparing a high barrier container by applying to the body sidewall portion of a polyester container a barrier label using a high barrier copolyester adhesive. More particularly, the invention is related to applying a high barrier copolyester barrier label to a polyester container sidewall by forming a barrier-effective, strong adhesive bond between the label and the container using a high barrier copolyester resin as a bonding agent.

The barrier properties of polyester plastic containers are important. For example, the oxygen permeability may determine the shelf-life of the package if it affects taste, color and/or other aspects of product quality. For carbonated beverages, the carbon dioxide permeability determines the carbonation loss rate of the container and, therefore, the shelf-life of the product.

Since the introduction of the PET plastic beverage bottle into the market, efforts have been going on to improve the barrier properties of the PET containers, in order to expand the use of PET for the packaging of food, wines, and carbonated beverages in smaller size containers.

Among the different ways of improving the $CO_2$ and $O_2$ permeability of polyester containers are: orientation, heat setting, barrier coatings and barrier labeling.

What is a barrier label? A barrier label is defined as "a label which consists of a low permeation or impermeable material attached with a high barrier adhesive to a plastic container, causing the container to exhibit an improved barrier performance."

In order to better understand the barrier label concept, one should examine the ineffective example of a prior art foil label which is schematically shown in FIG. 1. In this case, for carbonated beverages, the $CO_2$ gas permeates from the inside of the plastic container through the sidewall into the typical adhesive layer and the paper backing; both are poor barriers to $CO_2$. The aluminum foil is impermeable to gases; but the $CO_2$ can go through the adhesive and the paper to the outside.

An effective barrier label example, on the other hand, is shown in FIG. 2. In this case, the adhesive which bonds the aluminum foil to the sidewall of the container forms a strong bond and it is also a good barrier to $CO_2$. Therefore, as the $CO_2$ permeates from the inside through the bottle sidewall, it slowly reaches the foil and stops. Thus the $CO_2$ gas loss rate is significantly reduced. It should be emphasized that the adhesive should have a bond strength sufficient to withstand the pressure of $CO_2$ gas which can collect between the foil and the adhesive layer. If this bond strength is not sufficient, it can cause blistering and ultimately peeling off of the label.

Barrier labeling intended to use in food packaging must be able to withstand hot fill exposure without peeling off in addition to providing a good oxygen barrier. Current hot melt adhesives used for regular labels are usually activated at low temperatures, in general, less than 70° C.; and therefore are not suitable for hot fill and retort applications. Therefore, for a barrier label to be acceptable for carbonated beverage and food applications, the glue or the adhesive must satisfy the following requirements:

1. low permeability to gases especially $CO_2$ and $O_2$;
2. resistance to blistering or detachment due to $CO_2$ force;
3. stability at elevated temperatures so that it can be used for hot filling and retorting;
4. ease in applying the barrier label to the container by a practical commercial method.

The present invention provides methods and materials for producing plastic containers which can practically overcome the problems and meet the requirements identified above for effective barrier labeling. The present invention utilizes high barrier copolyesters as the barrier adhesives. Such copolyester resins can exhibit a wide range of activation temperatures. This makes them suitable for various forming processes such as orientation-blow molding, orientation blow molding-heat setting, extrusion blow molding and in-mold labeling. High barrier copolyesters are compatible with polyesters, preferably polyethylene terephthalate (PET) and; therefore, the adhesion between PET and the high barrier glue will be strong. The details of the invention will follow.

It is an object of the present invention to provide a process for producing a high barrier container comprising a hollow polyester or copolyester body with a barrier label effectively applied to its outer sidewall, the process including forming the container by an extrusion blow method, injection blow method, orientation-blow method, or orientation blow-heat set method and applying the barrier label via an "in-mold" technique utilizing a heat-activatable high barrier copolyester resin as the adhesive.

It is an object of the present invention to provide a process and an article produced thereby, in which a high barrier label is applied to a polyester or copolyester container using a heat activated high barrier copolyester material that is provided on the sidewall by utilizing the copolyester material easily and effeciently in production processes including heat-setting, once the container is made or in processes for forming the container including orientation-blow molding from extruded or injection-molded parisons, extrusion blow molding and "in-mold" labeling.

It is an object of the present invention to provide a process, and a product made thereby, for applying a high barrier label to a sidewall of a polyester or copolyester container including a polyethylene terephthalate (PET) beverage bottle using a high barrier copolyester label or other barrier label and adhering the label using a high barrier copolyester resin whose bonding characteristics are activated by heat exposure during the container forming process. Such heat activation provides a strong, effective, high barrier bond between the barrier label and the sidewall and reduces the $O_2$ and $CO_2$ permeabilities of the container sidewall.

These and other objects will be apparent from the specification that follows, and the drawings, in which.

The present invention provides a method or producing a high barrier plastic container comprising a barrier label adhered to a hollow polyester container having an outer polyester side wall surface, the method comprising the steps of:
   A. applying a high barrier copolyester adhesive-coated label to the outer polyester sidewall of the container to form a label thereon; and
   B. heating the label and container to an appropriate activation temperature to soften the adhesive sufficiently to stick to the polyester wall and form an effective adhesive bond in a boundary area between the label and the wall.

In a preferred embodiment of the present invention, a high barrier label consisting of a thin low permeation film and a high barrier copolyester adhesive coated thereon is applied to the body portion of an oriented polyethylene terephthalate (PET) container, the container being a beverage bottle with sidewalls of about 8 to 20 mils in thickness, the I.V. of the PET being 0.65–0.90.

Figure 1:
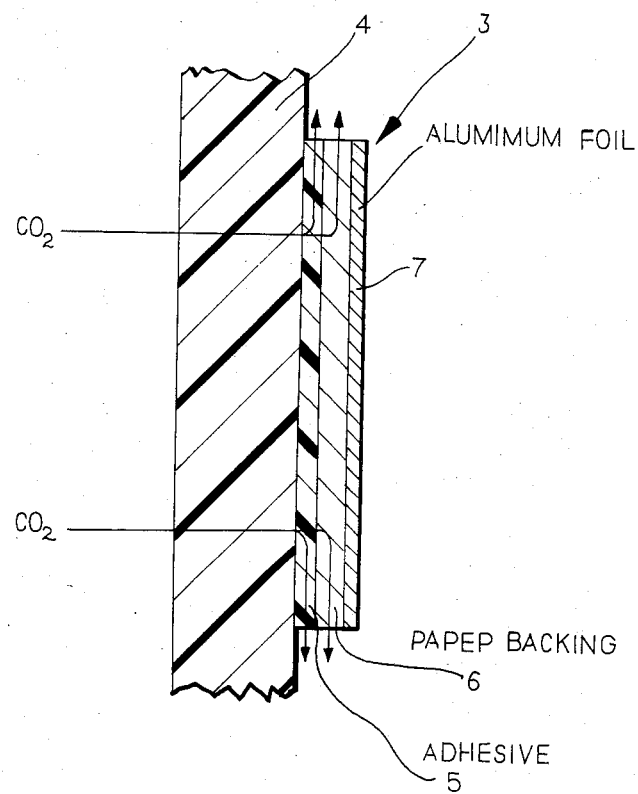
FIG. 1 is an enlarged fragmentary sectional view of a label on a container sidewall in accordance with the prior art.

As shown in FIG. 1, a low permeation thin film 3, backed by a paper layer 6, is glued to a container sidewall 4, with a low barrier adhesive layer 5, representing a typical ineffective barrier labelled container of the prior art.

Figure 2:
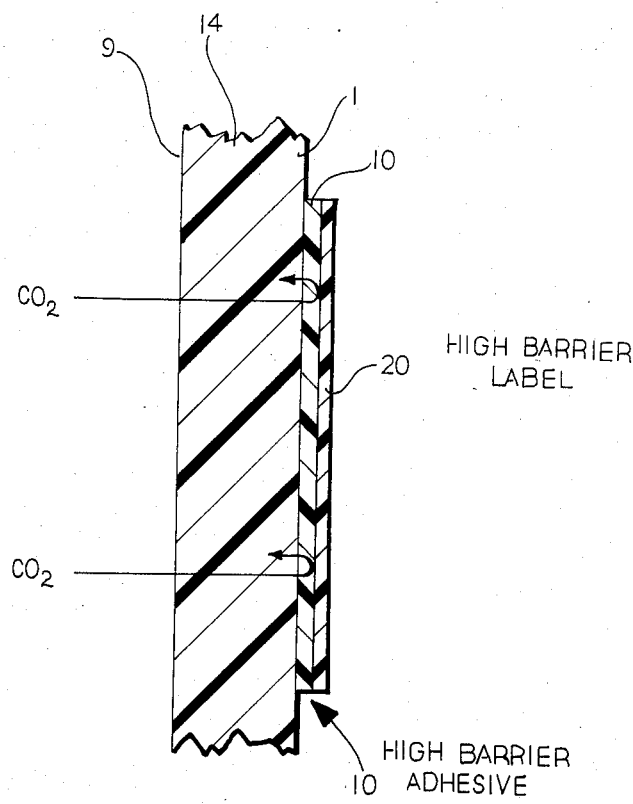
FIG. 2 is an enlarged sectional view of a high barrier label adhered to a sidewall of a polyester container using a high barrier copolyester adhesive in accordance with the present invention.

An effective barrier labelled container based on the subject invention is shown in FIG. 2 consisting of an oriented polyester bottle 9, with a high barrier label 20, bonded to the outer surface 15 of the bottle sidewall 14, with a high barrier, heat-activated copolyester adhesive layer 10. As for instance, seen in FIG. 2, there is a boundary layer or region between the bottle sidewall 14 and the label 20, the external surface 15 and label being strongly bonded together by heat-activating the high barrier copolyester adhesive 10 using a hot mold whose temperature is at least about 100° C., which is above the glass transition temperature ($T_g$) of the adhesive, as well as, of course, the bottle which generally has a lower $T_g$.

Figure 3:
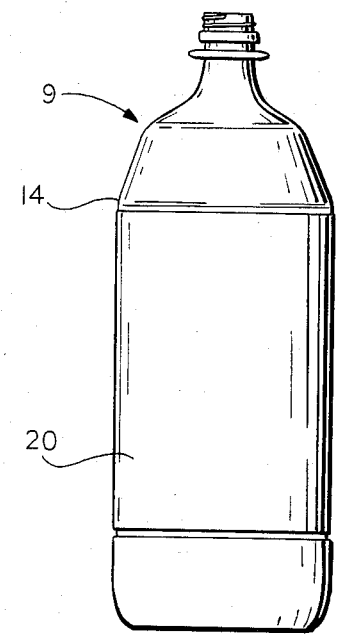
FIG. 3 is an elevational view of a PET bottle having a high barrier label attached thereto around its body portion.

Typically, the barrier label 20 would be decorated via conventional printing on its outer surface to provide a decorated container 9, as shown in FIG. 3. Alternatively, the bottle can be provided with a non-barrier (permeable) layer over the label 20, the layer being paper, plastic (generally not oriented) or other printable, easily applied material.

Figure 4:
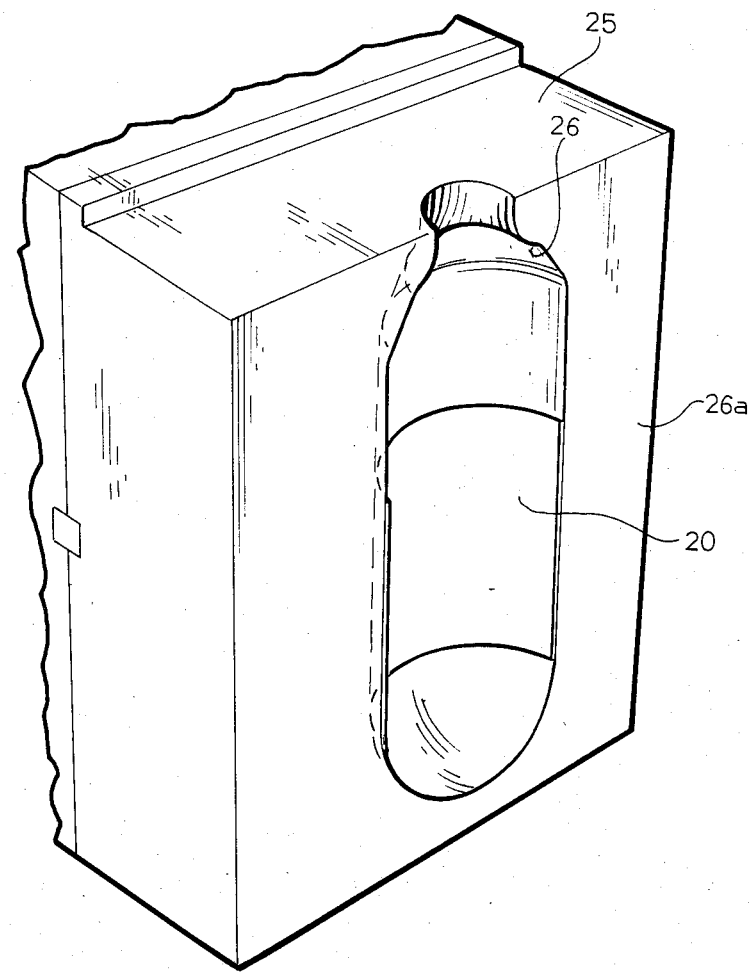
FIG. 4 is a perspective view showing a high barrier label coated with a heat-activatable high barrier copolyester adhesive in a blow mold whereby a bottle can be blown against the label in an in-mold process.

As seen in FIG. 4, the barrier label 20 can be inserted into a portion of a blow mold 25 having inner walls 26 whereby a parison is blown into contact with the walls 26 to provide a labeled bottle in an in-mold process.

The polyester container sidewall is generally about 10 to 30 mils in thickness, the label of low permeation film coated with high barrier copolyester resin adhesive is usually about 1 mil to 6 mils in thickness and preferably about 2 to 4 mils.

The copolyester is made as described in Example 5 of U.S. Pat. No. 4,398,017 for an invention of Santos W. Go (assigned to Owens-Illinois, Inc.).

The invention further contemplates a process of providing a high barrier multilayer plastic label to a hollow biaxially oriented polyethylene terephthalate container having a sidewall around its body portion, the label comprising an impervious copolyester layer and a pervious layer suitable for printing indicia thereon; the copolyester being a solid thermoplastic copolyester consisting essentially of the polymeric reaction product of
   A. reactant(s) selected from isophthalic acid, terephthalic acid and their $C_1$ to $C_4$ alkyl esters, and any mixture thereof in any proportion,
   B. reactants, 1,3 bis (2-hydroxyethoxy) benzene plus ethylene glycol, and optionally one or more other ester forming dihydroxy organic hydrocarbon reactant(s), and optionally,
   C. reactant, bis (4-B-hydroxyethoxphenyl) sulfone, wherein
      1. the amount of said 1,3 bis (2-hydroxyethoxy) benzene is 5–90 mol percent of the amount of A reactants,
      2. the combined amount of B and C reactants is about 110 to 300 mol percent of the amount of a reactants,
      3. the amount of said other ester forming dihydroxy organic hydrocarbon reactant(s) is zero to 20 mol percent of the amount of said A reactants, and
      4. the combined amount of said reactant plus said 1,3 bis (2-hydroxyethoxy) benzene and said other ester forming dihydroxy organic hydrocarbon reactant(s) is not over 90 mol percent of said A reactants; the process comprising the steps of:
         a. applying the level to the container sidewall with the adhesive copolyester layer next to the container sidewall, and
         b. heating the copolyester layer of the label and sidewall at least about 20° C. above the glass transition temperature of the copolyester to soften the copolyester layer and sidewall to form a strong bond therebetween in a boundary layer portion therebetween.

EXAMPLE I

Into a 1-liter stainless steel reactor equipped with a stirrer, nitrogen gas inlet port and a condenser, the following were added:

| | |
|---|---|
| 332.3 g | isophthalic acid |
| 180 g | ethylene glycol |
| 59.4 g | 1.3 bis(2-hydroxyethoxy)benzene |
| 0.7209 g | 1.1.1 tris(hydroxymethyl)ethane |
| 0.1100 g | titanyl acetylacetonate |
| 0.1458 g | $Sb_2O_3$ |
| 0.019 g | tetrasodium ethylenediaminetetraacetate |

The reaction mixture was heated at 220° C. for 1 hour, and then at 240° C. for 30 minutes under nitrogen atmosphere. Water was continuously distilled out during this period. Then 0.688 g of tris(nonylphenyl) phosphite was added to the mixture in the reactor. The reaction temperature was increased to 250° C. and maintained for 40 minutes under nitrogen atmosphere. Then the nitrogen gas flow was stopped and a vacuum of less than 0.4 mmHg was applied. The reaction was continued at 270° C. under less than 0.4 mm Hg for 4½ hours. The copolyester had an inherent viscosity of 0.82. The glass transition temperature was 60° C. The $O_2$ and $CO_2$ gas permeabilities were 1.6 and 6.6 cc. mil/100 in.$^{-2}$.day atm., respectively.

One of the main advantages of this invention is obtained by the use of a high barrier copolyester adhesive which is activated at bottle forming conditions (>90° C.) to bond in-mold labels to PET bottles to provide a high barrier container. The following Table 1 illustrates the activation temperatures for the processes involved.

TABLE 1
ACTIVATION TEMPERATURES FOR COPOLYESTER ADHESIVES

| (Bottle Material) Process | Label Material | Hi-Barrier Copolyester Label Material | Other Label Materials | Bottle Temperature |
|---|---|---|---|---|
| Orientation-Blow | (PET) | <100° C. | <100° C. | Bottle At 90°–100° C. |
| Orientation-Blow/ Heat-Set | (PET) | Not Applicable | <100° C. >100° C. | Bottle Mold Cold 90°–100° C. 200°–240° C. |
| Injection-Blow or Extrusion-Blow (Non-oriented) | (Copolyester) eg PET G | Not Applicable | >100° C. | Bottle at 150° C.–200° C. |

As shown in Table 1, for orientation-blow molding, it is possible to use a high barrier heat stable copolyester material as the barrier label film itself in conjunction with a suitable heat activatable high barrier copolyester resin as the bonding agent. In such a case a coextrusion of a heat-stable high barrier copolyester material and a heat-activatable high barrier copolyester resin is prepared and labels of the desired length cut from the coextruded sheet.

The label can be applied to the bottle sidewall by wrapping the label around the bottle, by telescoping a copolyester sleeve label from below the bottle upwardly into place, and by blowing the bottle into a mold with the label located on the inside of the mold in an in-mold process.

The following heat-set example illustrates the present invention.

EXAMPLE II

The label is inserted into the blow mold and maintained in the appropriate position by applying vacuum. The mold is heated to 230° C. for example. The polyester preform or the polyester bottle is blown against the hot mold and kept in contact with the mold to effect heat setting of the polyester container and to activate the barrier label, after which the mold is opened and the bottle is removed and cooled. In this way a strong adhesion exists between the barrier label and the polyester container.

What is claimed is:

1. A method of providing a high barrier plastic label to a hollow polyester container having an outer polyester wall surface, the method comprising the steps of:
   A. forming a heat activatable, high barrier copolyester adhesive layer on the inside surface of a low permeation labeling film to form a label the copolyester being a reaction product of isophthalic acid or terephthalic acid, ethylene glycol, and 1,3 bis (2-hydroxy)benzene,
   B. forming a polyester container having a body and an outer polyester wall surface,
   C. applying the label to the outer wall surface of the container, and
   D. heating the label and container to soften the copolyester adhesive layer sufficiently to stick to the polyester wall and form an adhesive bond in a boundary area between the label and the wall.
2. A method of producing an effective barrier labelled container as defined in claim 1 in which the copolyester adhesive layer is activated as the container is blown.
3. A method as defined in claim 1 in which the container is formed by extrusion-blow molding.
4. A method as defined in claim 1 in which the container is formed by injection blow molding.
5. A method as defined in claim 1 in which the high barrier layer is formed on a parison that is subsequently formed into the container.
6. A method of providing a high barrier plastic label to a sidewall of a body portion of a polyethylene terephthalate container, the method comprising the steps of:
   A. forming a solid thermoplastic copolyester label around the body sidewall of the container, the label including an adhesive copolyester layer that contacts the sidewall, the copolyester being a reaction product of
      (1) an isophthalic acid or terephthalic acid
      (2) ethylene glycol and 1,3 bis (2-hydroxyethoxy) benzene, the copolyester having an I.V. of at least about 0.6, a glass transition temperature of about 60° to 75° C., an oxygen permeability of about 1 to 6 and a $CO_2$ permeability of about 5 to 10 cc/mil/100 inch$^2$ day atmosphere; and
   B. heating the label and container to at least about 100° C. to soften the label to form an adhesive boundary between the label and the container sidewall.
7. A method as defined in claim 6 in which there is the step of forming an outer pervious layer over the copolyester that becomes the outer layer of the label formed around the container.
8. A method as defined in claim 1 in which the heating of Step B is at about 100° C. to 250° C.
9. A method as defined in claim 1 in which the heating of Step B softens the copolyester and simultaneously heat sets the polyester sidewall.
10. A product produced by the process of claim 1.
11. A product produced by the process of claim 1 in which the polyester is polyethylene terephthalate.
12. A product produced by the process in claim 1 in which the polyester sidewall is about 15 to 30 mils thick and the copolyester is about 1/10 to 1 mil thick.
13. A hollow polyester or copolyester container having an outer sidewall surface, a high barrier copolyester material label bonded to the outer sidewall surface by a boundary layer between the container sidewall and the label formed by a copolyester adhesive layer of the label contacting and adhered to the sidewall surface, the copolyester layer material being a reaction product of isophthlatic acid, ethylene glycol and 1,3 bis (2-hydroxyethoxy) benzene.

* * * * *